US012408241B2

(12) United States Patent
Yang et al.

(10) Patent No.: US 12,408,241 B2
(45) Date of Patent: Sep. 2, 2025

(54) OVEN AND METHOD FOR CONTROLLING OVEN (71) Applicant: LG ELECTRONICS INC., Seoul (KR)

(72) Inventors: Jaekyung Yang, Seoul (KR); Hoonseob Sim, Seoul (KR); Soochan Lee, Seoul (KR); Yongsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 531 days.

(21) Appl. No.: 16/633,458

(22) PCT Filed: Jul. 11, 2018

(86) PCT No.: PCT/KR2018/007830
§ 371 (c)(1),
(2) Date: Jan. 23, 2020

(87) PCT Pub. No.: WO2019/022410
PCT Pub. Date: Jan. 31, 2019

(65) Prior Publication Data
US 2020/0236743 A1    Jul. 23, 2020

(30) Foreign Application Priority Data

Jul. 28, 2017  (KR) .................. 10-2017-0096222

(51) Int. Cl.
*H05B 6/64* (2006.01)
*F27D 21/02* (2006.01)
(Continued)

(52) U.S. Cl.
CPC ........... *H05B 6/6435* (2013.01); *F27D 21/02* (2013.01); *G03B 21/145* (2013.01); *G03B 21/56* (2013.01);
(Continued)

(58) Field of Classification Search
CPC ........ F24C 15/02; F24C 15/021; F24C 7/085; F24C 15/04; F24C 7/06; F24C 7/08–088;
(Continued)

(56) References Cited

U.S. PATENT DOCUMENTS

2007/0246453 A1   10/2007   Nam et al.
2010/0139638 A1    6/2010   Hargrave et al.
(Continued)

FOREIGN PATENT DOCUMENTS

DE            20103517    *  5/2001
DE      10 2004 036212       3/2006
(Continued)

OTHER PUBLICATIONS

Webster definition "project" (Year: 2022).*
(Continued)

*Primary Examiner* — Sang Y Paik
*Assistant Examiner* — Bonita Khlok
(74) *Attorney, Agent, or Firm* — KED & ASSOCIATES, LLP (57) ABSTRACT An oven and a method for controlling an oven are provided. The oven includes a case; a cooking chamber formed inside of the case; and a door installed at one side of the case so as to open and close the cooking chamber. The door includes an outer plate forming an exterior thereof; an inner plate spaced a predetermined distance apart from the outer plate and in contact with the cooking chamber, and a door display disposed between the outer plate and the inner plate so as to display predetermined information on the outer plate.

9 Claims, 9 Drawing Sheets (51) Int. Cl.
*G03B 21/14* (2006.01)
*G03B 21/56* (2006.01)

(52) U.S. Cl.
CPC ........... *H05B 6/6414* (2013.01); *H05B 6/642* (2013.01); *F27D 2021/026* (2013.01)

(58) Field of Classification Search
CPC .... F25D 29/005; F25D 23/028; F25D 27/005; F25D 2400/36–361; H05B 6/6414; H05B 6/6435; H05B 6/6447; G03B 21/10; G03B 21/145; G03B 21/56; F27D 2021/026; F27D 21/02
USPC ......................................... 219/739, 740, 720
See application file for complete search history.

(56) References Cited

U.S. PATENT DOCUMENTS

| | | | |
|---|---|---|---|
| 2012/0076351 | A1 | 3/2012 | Yoon et al. |
| 2016/0327279 | A1* | 11/2016 | Bhogal ................ A47J 36/321 |
| 2016/0327281 | A1* | 11/2016 | Bhogal ................ A47J 36/321 |
| 2017/0000292 | A1 | 1/2017 | Park et al. |
| 2017/0328577 | A1* | 11/2017 | Reinhard-Herrscher .................... E05B 17/10 |
| 2017/0356672 | A1* | 12/2017 | Kim ....................... G03B 21/10 |
| 2018/0003395 | A1* | 1/2018 | Reinhard-Herrscher .................... E05B 1/0084 |
| 2020/0049401 | A1* | 2/2020 | Staud ................ G03B 21/2033 |

FOREIGN PATENT DOCUMENTS

| | | | |
|---|---|---|---|
| DE | 10-2012-103684 | | 10/2013 |
| EP | 3 034 948 | | 6/2016 |
| FR | 2362149 | * | 8/2011 |
| KR | 10-2007-0103871 | | 10/2007 |
| KR | 10-2010-0134430 | | 12/2010 |
| KR | 10-2014-0039733 | | 4/2014 |
| KR | 10-2017-0004522 | | 1/2017 |
| WO | WO 2009/138359 | | 11/2009 |
| WO | WO 2016/128370 | | 8/2016 |

OTHER PUBLICATIONS

English translation to EP 2362149 (Year: 2011).*
English translation to DE20103517 (Year: 2001).*
European Search Report issued in Application No. 18838402.8 dated Mar. 4, 2021.
International Search Report (with English Translation) dated Oct. 16, 2018 issued in Application No. PCT/KR2018/007830.
Written Opinion dated Oct. 16, 2018 issued in Application No. PCT/KR2018/007830.
European Search Report issued in Application No. 24183715.2 dated Sep. 12, 2024.

* cited by examiner

OVEN AND METHOD FOR CONTROLLING OVEN

CROSS-REFERENCE TO RELATED PATENT APPLICATIONS

This application is a U.S. National Stage Application under 35 U.S.C. § 371 of PCT Application No. PCT/KR2018/007830, filed Jul. 11, 2018, which claims priority to Korean Patent Application No. 10-2017-0096222, filed Jul. 28, 2017, whose entire disclosures are hereby incorporated by reference.

BACKGROUND

1. Field

An oven and a method of controlling an oven are disclosed herein.

2. Background Art

In general, an oven refers to a device for heating and cooking food disposed in a predetermined space. The oven may be divided into an electric type, a gas type, and an electronic type, for example, according to a heat source thereof. For example, the electric oven uses an electric heater as a heat source, a gas oven uses heat generated by gas as a heat source, and an electronic oven (microwave oven) uses friction heat of water molecules generated by a high frequency as a heat source.

When food is cooked using such an oven, it takes a relatively long time. Accordingly, a user may put food into the oven and then move to another place or perform another task.

A conventional oven is provided with a display panel for visualizing information on a cooking temperature and a cooking time to a user. The display panel has a limited size in terms of an installation space, and thus, has a relatively small size. Accordingly, the user cannot confirm the information visualized on the display panel at a relatively long distance.

In addition, in order to close a cooking chamber in which food is accommodated, the door of the oven is provided with a plurality of glass plates having a relatively large thickness. Therefore, it is difficult for the user to easily know the cooking process of the food in the oven through the door.

In addition, when the user opens the cooking chamber and checks the state of the food in order to know the cooking process of the food, heat in the cooking chamber may be discharged to the outside. Therefore, the cooking time may be increased and thermal efficiency may be lowered.

An object of embodiments devised to solve the problem lies in an oven including a display for visualizing predetermined cooking information on a door, and a method of controlling the same.

Another object of embodiments devised to solve the problem lies in an oven including a display having an adjustable size and capable of providing cooking information on a relatively wide screen and outputting an image of the inside of a cooking chamber, and a method of controlling the same.

Another object of embodiments devised to solve the problem lies in an oven including a first display for always providing cooking information according to ON/OFF of the oven and a second display for selectively providing cooking information during a cooking process, and a method of controlling the same.

An oven according to embodiments includes a case, a cooking chamber formed inside of the case, and a door installed at one side of the case to open and close the cooking chamber. The door includes an outer plate forming appearance, an inner plate spaced apart from the outer plate by a predetermined distance and being in contact with the cooking chamber, and a door display disposed between the outer plate and the inner plate to display predetermined information on the outer plate.

The door display may be provided as a projection module for projecting a predetermined image. The door display may be installed to project an image in a direction from the cooking chamber to the door.

The door display may include a driver configured to adjust a projection angle to change a size and position of a projected image. The door display may include a reflector configured to change a direction of projected light such that a predetermined image is displayed on the outer plate.

An air passage, through which predetermined air flows, may be provided between the outer plate and the inner plate, and the door display may be disposed on the air passage. An intermediate plate may be disposed between the outer plate and the inner plate, and the air passage may include a first air passage formed between the outer plate and the intermediate plate and a second air passage formed between the intermediate plate and the inner plate.

The door display may project a predetermined image on one surface of the outer plate forming the first air passage. An intermediate plate may be disposed between the outer plate and the inner plate, and the door display may be disposed below the intermediate plate.

The oven may further include a camera disposed at one side of the cooking chamber to photograph the inside of the cooking chamber. The door display may project an image photographed by the camera.

The door display may be turned off when the door opens the cooking chamber and may be turned on when the door closes the cooking chamber. The oven may further include a case display installed at one side of the case, and predetermined information may be displayed on at least one of the case display or the door display.

A method of controlling an oven including a case having a cooking chamber formed therein and a door installed on the case to open and close the cooking chamber may include applying power, displaying predetermined information on a case display installed on the case, heating an inside of the cooking chamber to start cooking, and displaying predetermined information on the door by a door display installed on the door. The case display may be turned on/off according to ON/OFF of the oven, and the door display may be turned on/off according to cooking start and cooking end. The door display may project and display, on the door, an internal image of the cooking chamber or an image related to cooking information.

According to embodiments, as predetermined cooking information is visualized on a door, it is possible to provide cooking information on a relatively wide screen. In addition, a user can easily check cooking information even at a relatively long distance.

Further, as an image of a camera for photographing the inside of a cooking chamber is visualized on the door, the user can easily check the internal state of the cooking chamber. Furthermore, as a predetermined image is projected and visualized, predetermined information can be displayed by changing a size and position thereof.

In addition, as an input panel is provided in the door, there is no need to provide a separate button and display screen on a front surface of a case. Therefore, as the door can be entirely provided on the front surface of the case, it is possible to provide cleaner appearance. As both a case display installed in the case and a door display installed in the door are provided, it is possible to more conveniently visualize information to the user.

DETAILED DESCRIPTION

Hereinafter, embodiments will be described in detail with reference to the accompanying drawings. In adding reference numerals to the components of each drawing, it should be noted that the same reference numerals are assigned to the same components as much as possible even though they are shown in different drawings. In describing embodiments, a detailed description of known functions and configurations will be omitted when it may obscure the subject matter.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected", "coupled", or "linked" to another element, one element may be "connected", "coupled", or "linked" to another element via a further element although one element may be directly connected to or may be directly linked to another element.

Figure 1:
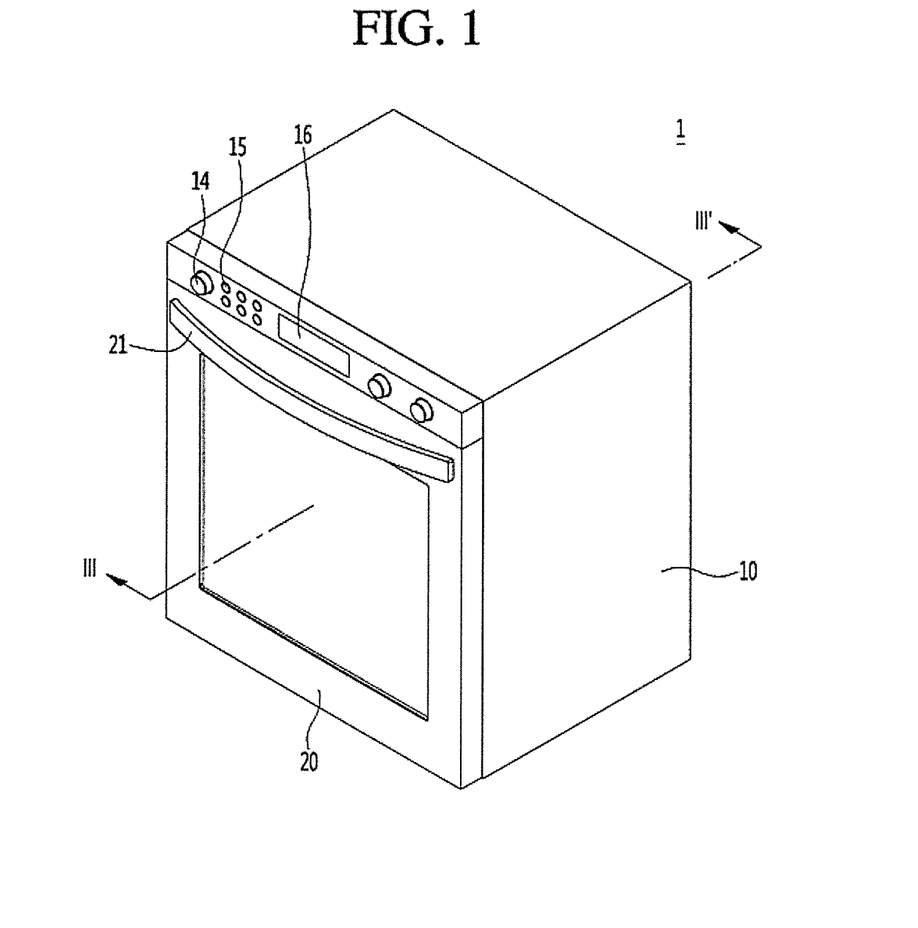
FIG. 1 is a view showing an oven according to an embodiment.
Figure 2:
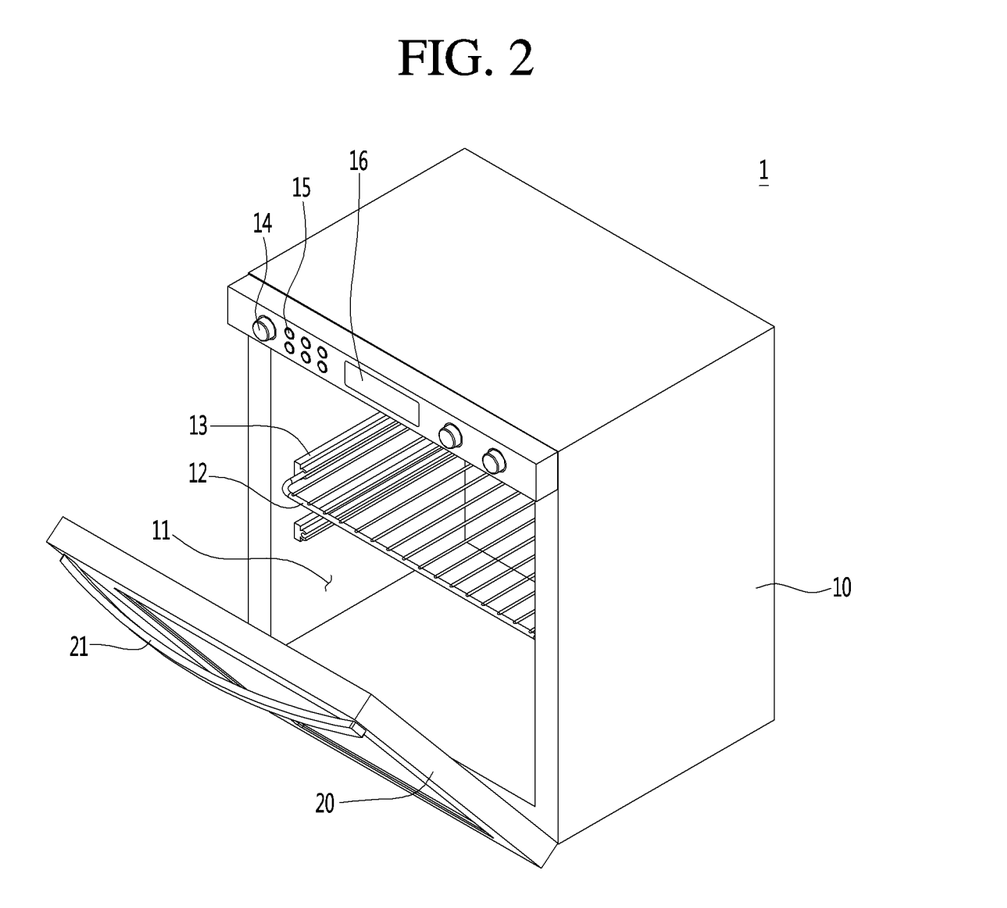
FIG. 2 is a view showing a state of opening a door of an oven according to an embodiment.
Figure 3:
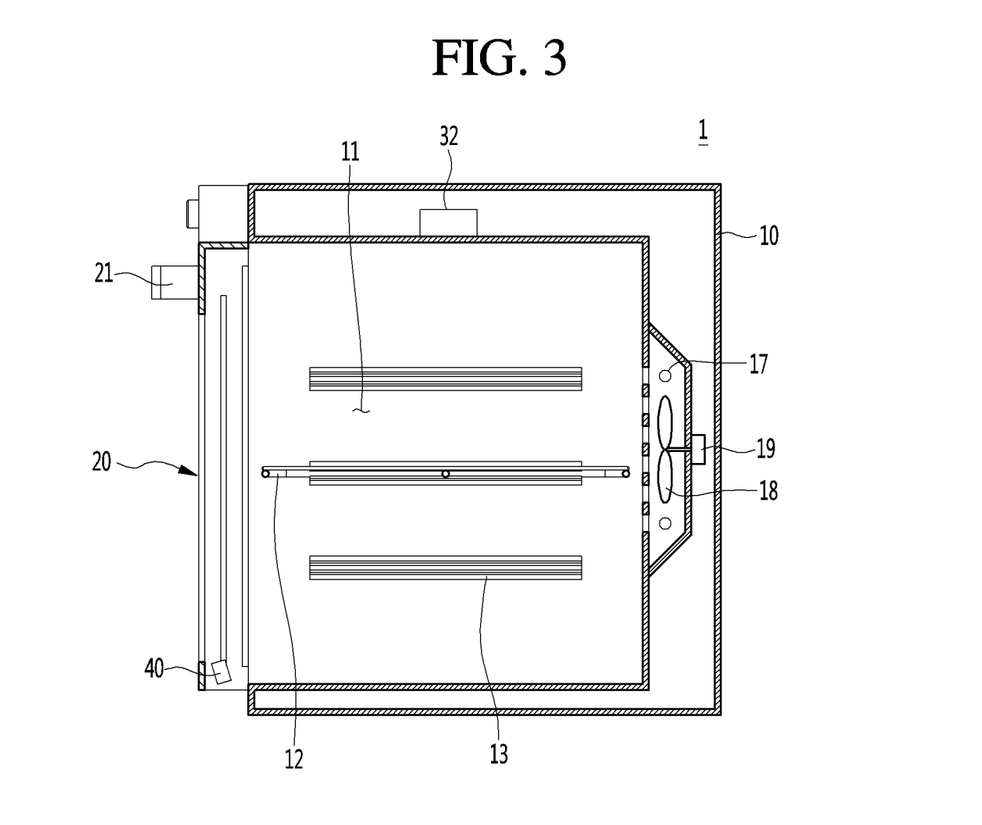
FIG. 3 is a cross-sectional view taken along line of FIG. 1.

FIG. 1 is a view showing an oven according to an embodiment. FIG. 2 is a view showing a state of opening a door of an oven according to an embodiment. and FIG. 3 is a cross-sectional view taken along line of FIG. 1. For convenience, FIGS. 1 to 3 show the configuration of the oven 1.

FIGS. 1 to 3, the oven 1 according to an embodiment includes a case 10 forming appearance thereof, and a door 20 attached to one surface of the case 10. The case 10 has an internal space and a front side thereof is opened. The case 10 may be formed in a predetermined box shape and may include a power supply 14, an input unit 15, and a display 16 provided to a user at the outside thereof.

The power supply 14 may have various shapes to allow a user to turn on/off the oven 1. In addition, the input unit 15 is provided with a plurality of buttons to allow the user to select various modes, a temperature, and a time, for example.

The display 16 may be understood as a component for visualizing predetermined information such that the user determines the state of the oven 1. In particular, the display 16 may be turned on/off according to ON/OFF of the power supply 14 and may be provided in the form of a predetermined panel. The display 16 will be described in detail below.

A cooking chamber 11 in which food is accommodated is formed in the case 10. A grill 12, on which food is placed, may be provided in the cooking chamber 11. In addition, grill mounting portions 13 may be provided on inner sidewalls of the cooking chamber 11 such that the grill is detachably installed. A number and shape of grills 12 and the grill mounting portions 13 may be variously changed.

In addition, a heating unit 17, a fan 18, and a fan motor 19 for providing a driving force to the fan 18 are disposed inside of the case 10 and outside of the cooking chamber 11. The heating unit 17 heats the inside of the cooking chamber 11 and the fan 18 is understood as a component for providing air flow in the cooking chamber 11.

The heating unit 17 may include an electric heater for dissipating heat by electric input and may be installed at one side of the case 10. In addition, the heating unit 17 may be installed at one side of the fan 18 and may be configured integrally with the fan 18. The fan 18 receives the driving force from the fan motor 19 to flow air heated by the heating unit 17 in the cooking chamber 11.

That is, the heating unit 17 and the fan 18 may be understood as components for cooking food in the cooking chamber 11, and shapes thereof are merely exemplary and may be variously changed. In addition, the oven 1 according to the embodiments is not limited to the electric oven using electricity using a heat source and may cook food using various heat sources, such as a gas- or electronic-type heat source.

The door 20 is disposed on an open front surface of the case 10 to open and close the cooking chamber 11. That is, the cooking chamber 11 may be opened and closed by the door 20. For convenience of description, the configuration related to the installation structure and locking device of the door 20 has been omitted.

As shown in FIG. 2, the door 20 is installed on a front surface of the case 10 to be rotatable forward. In addition, the door 20 may be provided with a handle 21 capable of being gripped and rotated by the user.

In addition, the oven 1 according to embodiments may be provided with a predetermined detector capable of detecting an internal state of the cooking chamber 11. The detector may include a camera 32 capable of photographing the inside of the cooking chamber 11. The camera 32 may be disposed at one side of the cooking chamber 11 to provide an image of the inside of the cooking chamber 11.

FIG. 3 exemplarily illustrates the camera 32 disposed on an outer upper side of the cooking chamber 11. The number and positions of cameras 32 may be variously changed to photograph the inside of the cooking chamber 11, thereby generating the internal image of the cooking chamber 11.

The oven 1 according to embodiments may have various components and these components are merely exemplary and may be omitted or other components may be added.

Hereinafter, the display of the oven 1 according to embodiments will be described in detail.

Figure 4:
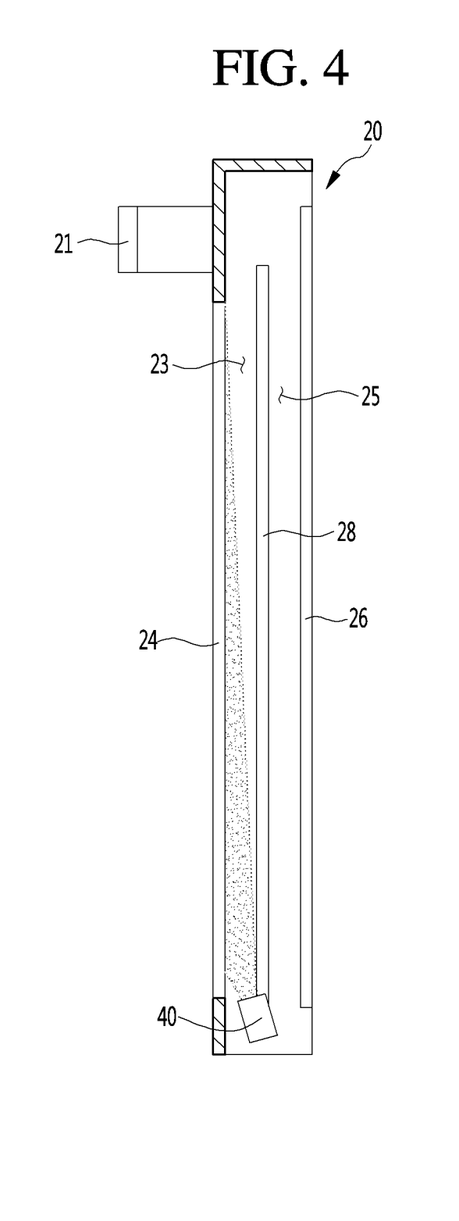
FIG. 4 is a view showing operation of a display installed in an oven according to an embodiment.

FIG. 4 is a view showing operation of a display installed in an oven according to an embodiment. As shown in FIG.

4, the door 20 is formed of a plurality of plates. The plates include an outer plate 24 forming an appearance of the oven 1, an inner plate 26 in contact with the cooking chamber and an intermediate plate 28 disposed between the outer plate 24 and the inner plate 26.

The intermediate plate 28 may be omitted or a plurality of intermediate plates may be provided.

Hereinafter, assume that one intermediate plate 28 is provided.

The outer plate 24, the inner plate 26, and the intermediate plate 28 have predetermined thicknesses such that heat in the cooking chamber 11 is not transmitted to the outside. In addition, the plates 24, 26 and 28 are composed of transparent glass plates such that the user views the cooking chamber 11 via the door 20.

The plates may be spaced apart from each other at predetermined intervals to form an air passage for minimizing heat transmission. Specifically, a first air passage 23 is formed between the outer plate 24 and the intermediate plate 28, and a second air passage 25 is formed between the intermediate plate 28 and the inner plate 26. For example, air introduced from a lower portion of the door 20 is discharged to an upper portion of the door 20 via the air passages 23 and 25, thereby preventing heating of the door 20.

Due to the structure of the door 20, it is difficult for the user to observe the inside of the cooking chamber 11. That is, even if the plurality of plates has the predetermined thicknesses and the door 20 is provided with the transparent glass plates such that light is reflected according to the distance between the plates, it is difficult for the user to view the inside of the cooking chamber 11. As the above-described display 16 is provided in the case 10, and thus, a size thereof is limited, it is difficult for the user to know information shown thereon at a long distance.

Accordingly, the oven 1 according to embodiments is provided with display 40 installed in the door 20 to visualize predetermined information to the user. Hereinafter, in order to distinguish the display 40 from the above-described display 16, the display installed in the case is referred to as a case display 16 and the display installed in the door 20 is referred to as a door display 40.

That is, the oven 1 according to embodiments includes the display for visualizing predetermined information to the user, and the display includes the case display 16 and the door display 40. The case display 16 may be omitted (see FIG. 9).

The door display 40 is provided to project an image having predetermined information. That is, the door display 40 is understood as a projection module for projecting an image as a type of a head up display (HUD). In addition, the door display 40 may be at least one of a liquid crystal display (LCD), a thin film transistor liquid crystal display (TFT LCD), an organic light-emitting diode (OLED), a flexible display, a third-dimensional (3D) display, or an e-ink display.

AS shown in FIG. 4, the door display 40 is installed inside of the door 20. That is, the door display 40 is disposed between the outer plate 24 and the inner plate 26. In addition, the door display 40 may be disposed below the intermediate plate 28.

The door display 40 displays an image on the outer plate 24. Specifically, as shown in FIG. 4, the door display 40 projects the image onto the inner surface of the outer plate 24, that is, one surface forming the first air passage 23.

The outer plate 24 is made of a transparent material, such as glass, such that the image displayed by the door display 40 can be viewed at the outer surface of the outer plate 24, that is, outside of the oven 1. In particular, the door display 40 may display the image of the inside of the cooking chamber 11 photographed by the camera in addition to the predetermined image. Therefore, the user may intuitively check the state of the cooking chamber 11 without observing the cooking chamber 11 (directly) via the door 20.

In addition, although not shown, the door display 40 may be provided in various shapes. For example, the door display 40 may include a drive unit to adjust a projection angle. Therefore, a size and position of the image projected onto the door 20 may be changed.

The door 20 may be provided with a predetermined input panel, such that the user inputs a predetermined command by touching an image projected by the door display 40. If a sufficient projection angle is not secured inside of the door 20 or the image is not projected at a required position with a required size, a reflector may be further provided. The reflector may be a prism to reflect projected light at a predetermined angle with a predetermined size.

Comparison between the case display 16 and the door display 40 is as follows.

1) The case display 16 is provided as a predetermined display panel, and thus, a position and size of the displayed image are fixed. In contrast, the door display 40 is provided as a module for projecting a predetermined image, and thus, information may be displayed at various positions with various sizes.

In general, as upper and side surfaces of the oven are in contact with another device or a wall, the display and the door are disposed on the front surface of the oven. Therefore, 2) as the case display 16 is provided in the case 10, information with a relatively small size is visualized. That is, the size of the case display 16 may be limited by the door 20. In contrast, the door display 40 projects the predetermined image onto the door 20, and thus, visualizes the information with a relatively large size.

Hereinafter, a display state of the door display 40 will be described.

Figure 5:
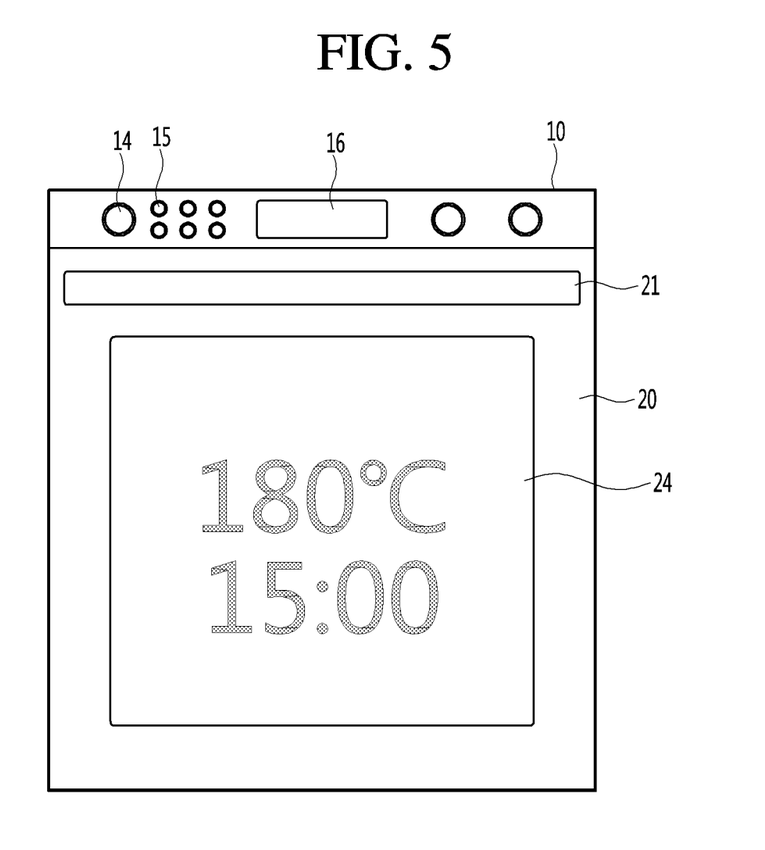
FIGS. 5 and 6 are views showing a display state of an oven according to an embodiment.
Figure 6:
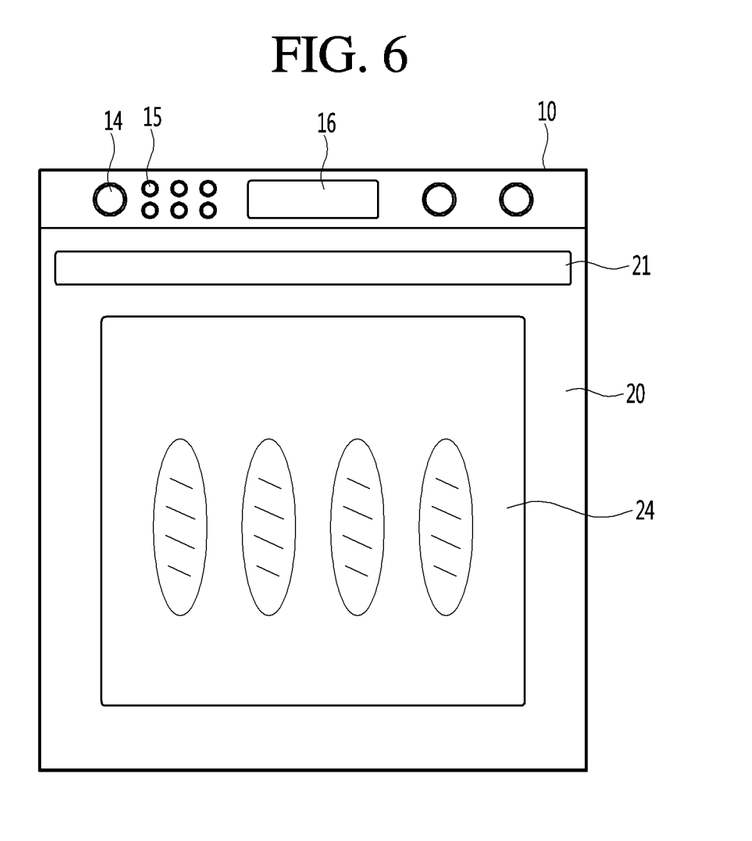

FIGS. 5 and 6 are views showing a display state of an oven according to an embodiment. As shown in FIGS. 5 and 6, the predetermined information is visualized on the front surface of the door 20 by the door display 40. As described above, the outer plate 24 is made of a transparent material such that the image projected inside the outer plate 24 is visualized to the outside.

Referring to FIG. 5, information on an internal temperature and a cooking time of the cooking chamber is displayed on the door 20 by the door display 40. In general, a time required to cook predetermined food in the cooking chamber 11 is relatively long and user's actions are not relatively often required. Accordingly, the user does not need to stay near the oven 1 and may move to a relatively distance place.

For example, the user may allow food to be cooked in the cooking chamber 11 of the oven 1 located in the kitchen and then move to a living room to watch TV. In addition, the user may see, in the living room, the oven 1 located in the kitchen, but may not read the information visualized on the case display 16.

The door display 40 is provided such that cooking information is checked at a long distance, thereby increasing convenience of the user. That is, the door display 40 may provide the cooking information with a larger size to intuitively deliver information to the user.

In addition, the image of the inside of the cooking chamber 11 may be displayed on the door 20 by the door display 40. That is, the image photographed by the camera 32 may be displayed on the door 20 via the door display 40.

As shown in FIG. 6, the user can conveniently check a state of cooking predetermined bread in the cooking chamber 11. For example, if cooking is completed when the bread rises, the user can easily check an extent of the rise of the bread via the image. In addition, as a cooking degree of the food can be easily determined by color change and size change of the food, it is possible to determine the state of the food even at a relatively long distance.

Figure 7:
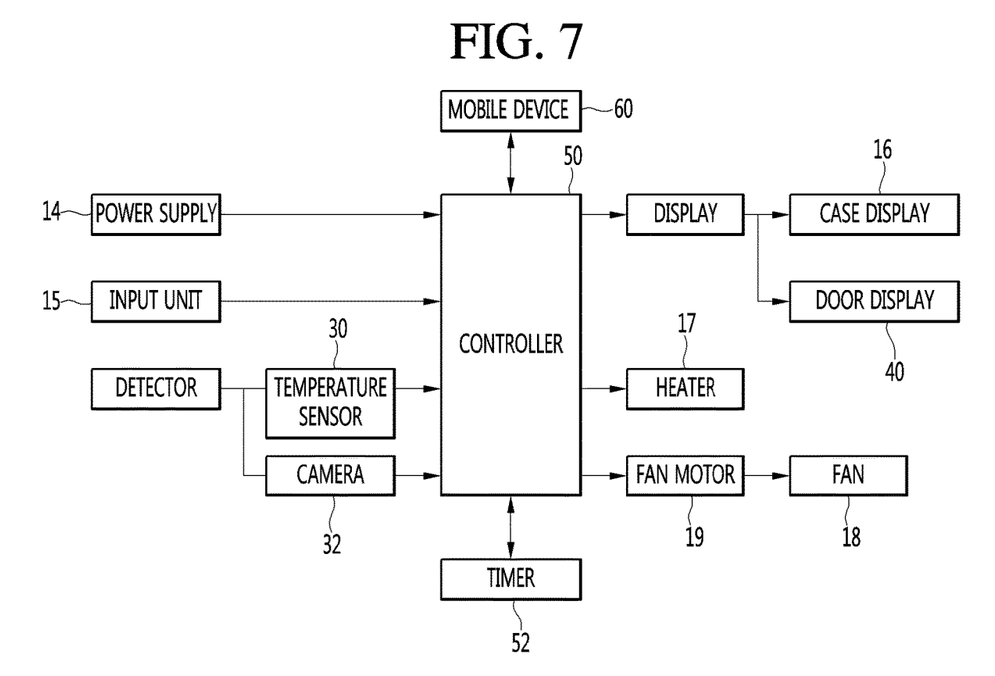
FIG. 7 is a view showing a control configuration of an oven according to an embodiment.

FIG. 7 is a view showing a control configuration of an oven according to an embodiment. The oven 1 according to embodiments includes a controller 50 for controlling the above-described components.

The user may transmit a predetermined command to the controller 50 using the power supply 14 and the input unit 15. The power supply 14 and the input unit 15 may be provided outside of the case 11 as described above or may be provided in a mobile device 60 of the user.

For example, the controller 50 and the mobile device are connected via Bluetooth, for example, to exchange predetermined information. That is, the user may input a command for controlling the oven 1 at a long distance. For example, the user may preheat the oven 1 using the mobile device 60 and approach the oven 1 to put food into the oven after preheating is completed.

The controller 50 may receive information detected by a predetermination detector. The detector may include the above-described camera 32 and a temperature sensor 30 for measuring the internal temperature of the cooking chamber 11. Specifically, the camera 32 photographs the inside of the cooking chamber 11 and transmits the generated image to the controller 50, and the temperature sensor 30 may transmit the internal temperature information of the cooking chamber 11 to the controller 50.

In addition, the controller 50 may be provided with a timer 52 for measuring a predetermined time. For example, the controller 50 may transmit a command to the timer 52 to measure a cooking time when cooking starts or turn on the oven 1 according to a reservation time.

The controller 50 may operate the heating unit 17 and supply power to the fan motor 19 to drive the fan 18.

In addition, the controller 50 may transmit predetermined information to the display or the mobile device 60 to visualize the predetermined information. For example, the temperature transmitted by the temperature sensor 30 and the cooking time measured by the timer 52 may be visualized.

The display includes the above-described case display 16 and the door display 40. The controller 50 may visualize information on at least one of the case display 16, the door display 40, or the mobile device 60.

Hereinafter, an example of controlling the display will be described along with operation of the oven 1. For convenience of description, description of the mobile device 60 will be omitted.

Figure 8:
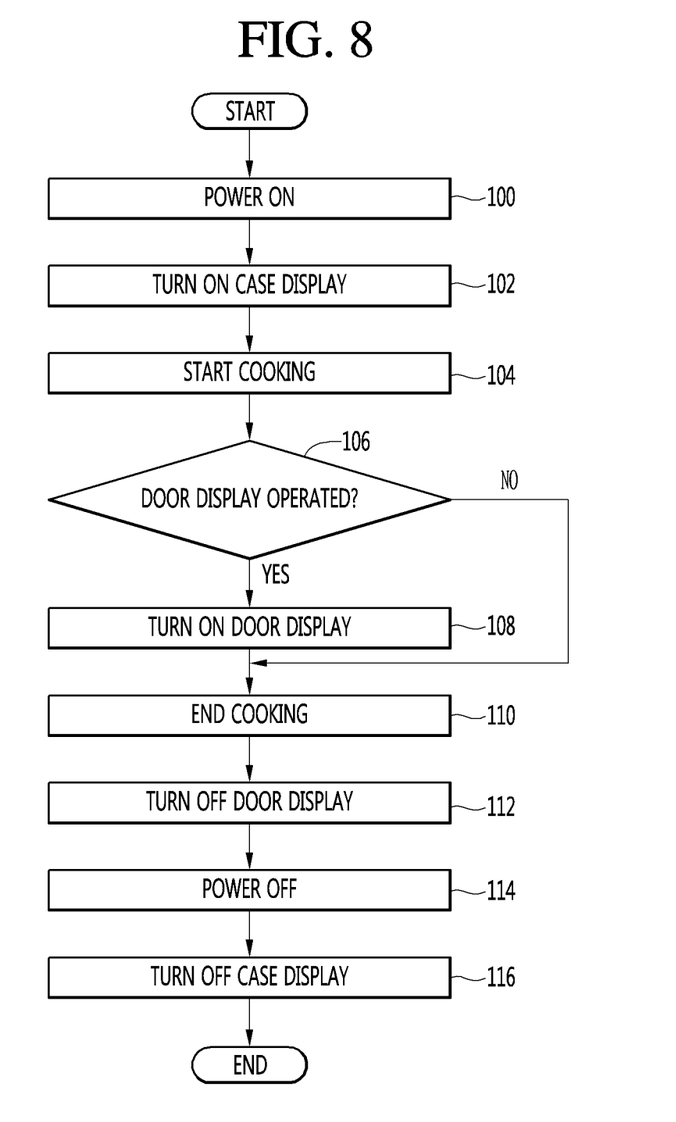
FIG. 8 is a flowchart illustrating a method of controlling an oven according to an embodiment.

FIG. 8 is a flowchart illustrating a method of controlling an oven according to an embodiment. As shown in FIG. 8, the oven 1 is turned on according to input of the power supply 14 (100). When the oven 1 is turned on, the case display 16 is turned on (102) and the user may determine that the oven 1 is turned on.

The heating unit 17 and the fan 18 are operated, in order for the user to put predetermined food into the oven 1 or to preheat the oven before putting food into the oven. Such a process may be understood as "start cooking 104".

When cooking starts, whether the door display 40 operates is determined (106). For example, when the user continues to watch the oven 1, operation of the door display 40 may not be selected. In addition, the controller 50 may not operate the door display 40 upon determining that power saving is required.

When operation of the door display 40 is selected, the door display 40 is turned on to project a predetermined image onto the door 20 (108). At this time, temperature and time information or image information of the camera 32 may be visualized on the door 20.

When cooking is completed (110), the door display 40 is turned off (112). In addition, when cooking is no longer performed, the oven 1 is turned off (114), and the case display 16 is also turned off (116). As such, the case display 16 may be turned on/off according to ON/OFF of the oven 1, and the door display 40 may be turned on/off only in certain circumstances.

FIG. 8 illustrates that the door display 40 is turned on during cooking. This is because, while cooking is performed by the oven 1, the user moves away from the oven 1. Therefore, the door display 40 provides information such that the information is visualized at a relatively long distance.

In addition, only when the door 20 closes the cooking chamber 11, the door display 40 may be turned on and operated. This is because, when the door 20 is opened, the user cannot view the information on the door display 40.

Further, the case display 16 may be omitted and information may be visualized only by the door display 40. Furthermore, the power supply 14 and the input unit 15 provided in the case 10 may be omitted and an input unit may be provided in the door 20.

Therefore, the door 20 may be entirely formed on the front surface of the oven 1. Accordingly, it is possible to provide an oven 1 having a cleaner appearance to the user.

Figure 9:
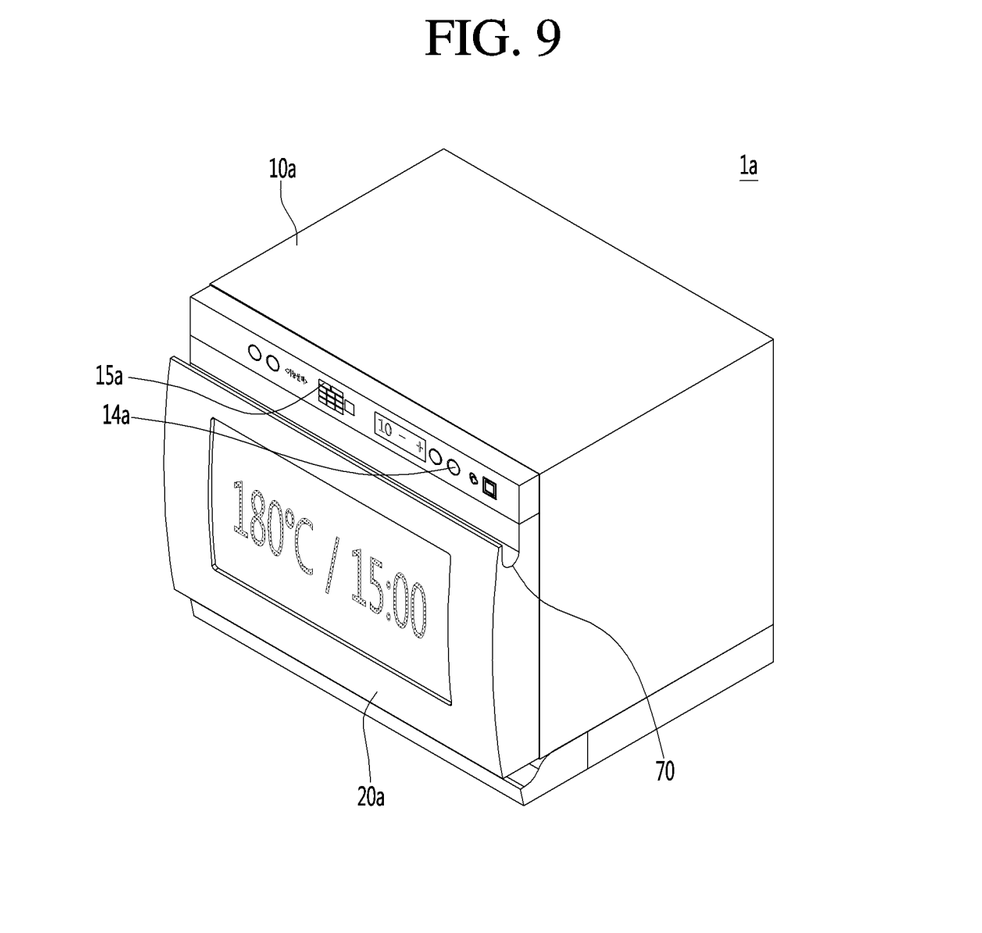
FIG. 9 is a view showing an oven according to another embodiment.

FIG. 9 is a view showing an oven according to another embodiment. As shown in FIG. 9, an oven 1a according to another embodiment includes a case 10a, a door 20a, a power supply 14a, and an input unit 15a.

The oven 1a may be provided as a handleless oven having the door 20a, in which a handle is omitted. The door 20a is provided with a door pocket 70 capable of being gripped by the user.

The door pocket 70 is formed to be recessed downward from an upper surface of the door 20a. Therefore, the door pocket 70 may not be visualized at a front exterior of the oven 1a, thereby providing an oven having a cleaner appearance to the user.

In addition, a display (not shown) for projecting a predetermined image is provided inside of the door 20a, such that an image projected onto the door 20a is checked via the display. For the display, refer to the description of the above-described door display. Predetermined information may be displayed on the door 20a using the door display for projecting the predetermined image even in the oven 1a in which the handle and the case display are omitted.

The invention claimed is:

1. An oven, comprising:
   a case;
   a cooking chamber formed inside of the case; and
   a door installed at one side of the case to open and close the cooking chamber, wherein the door includes:
   an outer plate forming an outer appearance thereof;
   an inner plate spaced apart from the outer plate by a predetermined distance and in contact with the cooking chamber;
   an intermediate plate disposed between the outer plate and the inner plate; and a door display disposed between the outer plate and the inner plate to project predetermined information including a predetermined image onto a rear surface of the outer plate as a type of a head up display (HUD), wherein an air passage includes a first air passage formed between the outer plate and the intermediate plate and a second air passage formed between the intermediate plate and the inner plate, wherein the door display is disposed below the intermediate plate so that the door display is not visible from a front of the door, and the door display includes a projection portion that projects the predetermined information and that is positioned in front of a front surface of the intermediate plate to prevent the predetermined information from passing through the intermediate plate, the predetermined information including the predetermined image being viewable through the outer plate from outside of the oven, and wherein the outer plate, the inner plate, and the intermediate plate are composed of transparent glass plates.

2. The oven of claim 1, wherein the door display projects the predetermined information including the predetermined image in a direction from the cooking chamber toward the door.

3. The oven of claim 1, wherein the door display includes a driver configured to adjust a projection angle to change a size and position of the predetermined information including the predetermined image.

4. The oven of claim 1, wherein the door display includes a reflector configured to change a direction of projected light such that the predetermined information including the predetermined image is displayed on the outer plate.

5. The oven of claim 1, wherein the door display projects the predetermined information including the predetermined image onto a surface of the outer plate forming the first air passage.

6. The oven of claim 1, further comprising a camera disposed at one side of the cooking chamber to photograph an inside of the cooking chamber, wherein the predetermined image comprises an image photographed by the camera.

7. The oven of claim 1, wherein the door display is turned off when the door opens the cooking chamber and is turned on when the door closes the cooking chamber.

8. The oven of claim 1, further comprising a case display installed at one side of the case, wherein the predetermined information is displayed on at least one of the case display or the door display.

9. The oven of claim 1, wherein an outlet of the door display from which the predetermined information is projected is disposed in front of the intermediate plate.

* * * * *